United States Patent
Doering et al.

(10) Patent No.: US 11,421,639 B2
(45) Date of Patent: Aug. 23, 2022

(54) METHOD AND SYSTEM FOR EXPANSION COMBUSTION DURING AN ENGINE START

(71) Applicant: Ford Global Technologies, LLC, Dearborn, MI (US)

(72) Inventors: Jeffrey Allen Doering, Canton, MI (US); Imtiaz Ali, Lathrup Village, MI (US); David Andrew Ord, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 16/919,412

(22) Filed: Jul. 2, 2020

(65) Prior Publication Data
US 2022/0003197 A1    Jan. 6, 2022

(51) Int. Cl.
| | | |
|---|---|---|
| F02N 11/08 | (2006.01) |
| F02D 41/00 | (2006.01) |
| F02D 41/06 | (2006.01) |
| F02D 41/38 | (2006.01) |
| F02P 5/14 | (2006.01) |

(52) U.S. Cl.
CPC ...... *F02N 11/0818* (2013.01); *F02D 41/0002* (2013.01); *F02D 41/009* (2013.01); *F02D 41/062* (2013.01); *F02D 41/38* (2013.01); *F02P 5/14* (2013.01); *F02D 2041/389* (2013.01); *F02D 2200/021* (2013.01); *F02D 2200/024* (2013.01); *F02D 2200/0406* (2013.01); *F02D 2200/0614* (2013.01); *F02N 2200/022* (2013.01); *F02N 2200/023* (2013.01)

(58) Field of Classification Search
CPC ............... F02D 41/062; F02D 41/065; F02D 2041/389; F02N 11/0818; F02N 2019/002
See application file for complete search history.

(56) References Cited

U.S. PATENT DOCUMENTS

| | | | |
|---|---|---|---|
| 5,394,857 A * | 3/1995 | Yamakawa | .......... F02D 41/065 123/491 |
| 6,098,585 A | 8/2000 | Brehob et al. | |
| 6,834,632 B2 | 12/2004 | Kataoka et al. | |
| 7,051,693 B2 | 5/2006 | Tetsuno et al. | |
| 7,278,388 B2 | 10/2007 | Lewis et al. | |
| 8,370,051 B2 | 2/2013 | Pursifull et al. | |
| 10,781,758 B2 * | 9/2020 | Kanno | ................ F02N 11/0814 |
| 2005/0109302 A1 | 5/2005 | Tetsuno et al. | |
| 2006/0180112 A1 * | 8/2006 | Katayama | .......... F02D 41/3836 123/179.4 |
| 2007/0006831 A1 | 1/2007 | Leone et al. | |

(Continued)

*Primary Examiner* — Phutthiwat Wongwian
*Assistant Examiner* — Anthony L Bacon
(74) *Attorney, Agent, or Firm* — Vincent Mastrogiacomo; McCoy Russell LLP

(57) ABSTRACT

Methods and systems are provided for performing expansion combustion in an engine of a start-stop vehicle. In one example, a method may include, responsive to receiving an auto-start request to restart an engine from an auto-stop, determining a fuel mass to inject into a cylinder for an expansion combustion event based on a duration of the auto-stop, and actuating a spark plug of the cylinder after injecting the determined fuel mass to perform the expansion combustion event. In this way, an air-fuel ratio of the expansion combustion event may be more accurately controlled, resulting in more robust expansion combustion engine restarts.

18 Claims, 5 Drawing Sheets

(56) References Cited

U.S. PATENT DOCUMENTS

| | | |
|---|---|---|
| 2007/0209618 A1 | 9/2007 | Leone |
| 2008/0066706 A1 | 3/2008 | Nakamura et al. |
| 2008/0077308 A1 | 3/2008 | Laubender |
| 2008/0154484 A1* | 6/2008 | Takeyama ............. F02D 41/065 701/113 |
| 2011/0144891 A1* | 6/2011 | Nakamura ............ F02D 41/068 701/104 |
| 2014/0251267 A1 | 9/2014 | Hashemi et al. |
| 2015/0159580 A1* | 6/2015 | Matsuda ................ F02D 37/02 701/104 |
| 2015/0192081 A1* | 7/2015 | Ranspach ............... F02D 41/18 60/274 |
| 2018/0058407 A1* | 3/2018 | Hayashima ......... F02D 13/0234 |

* cited by examiner

METHOD AND SYSTEM FOR EXPANSION COMBUSTION DURING AN ENGINE START

FIELD

The present description relates generally to methods and systems for operating an engine that may be automatically stopped and started.

BACKGROUND/SUMMARY

A vehicle may include an engine that may be automatically stopped and started to conserve fuel, such as via a start-stop system. The engine may be stopped via a controller in response to vehicle operating conditions without receiving a specific request to stop the engine from a driver or occupant of the vehicle. Similarly, in response to other operating conditions, the controller may auto-start the engine. However, frequently restarting the engine may increase wear on a starter motor.

Other attempts to reduce wear on a starter motor of a start-stop system include using expansion combustion to produce torque to start or assist starting the engine. One example approach is shown by Tetsuno et al. in U.S. Pat. No. 7,051,693 B2. Therein, an engine starting system injects fuel into an expansion stroke cylinder and combusts a resulting mixture in response to an engine restart request given in an engine stop period before complete engine stop is reached.

However, the inventors herein have recognized potential issues with such systems. As one example, the robustness and effectiveness of the combustion varies based on an air-fuel ratio of the mixture in the cylinder. During an engine auto-stop, air trapped in a cylinder may leak past sealing rings to equalize a pressure in the cylinder with a pressure in an engine crankcase. Therefore, the mass of the air in the cylinder varies over time. If the changing air mass in the cylinder is not accounted for, the torque produced by the expansion combustion may be decreased due degraded air-fuel ratio control. As another example, misfire may occur, resulting in substantially no torque being produced.

In one example, the issues described above may be addressed by a method, comprising: responsive to a request to restart an engine from an auto-stop, determining a fuel mass to inject into a cylinder for a restart combustion event based on a duration of the auto-stop; and injecting the determined fuel mass and actuating a spark plug of the cylinder to perform the restart combustion event. In this way, the air-fuel mixture in the cylinder may be accurately controlled by accounting for changes in the aircharge that occur during the auto-stop.

As one example, determining the fuel mass to inject into the cylinder for the restart combustion event based on the duration of the auto-stop includes correcting an aircharge of the cylinder based on the duration of the auto-stop and determining the fuel mass based on the corrected aircharge. As an example, correcting the aircharge of the cylinder based on the duration of the auto-stop may include determining an aircharge variation that occurs over the duration of the auto-stop. For example, a controller may model the aircharge variation from an initial aircharge toward an equilibrium aircharge. The initial aircharge may be determined based on an intake manifold pressure at a final intake valve closing of the cylinder during the auto-stop, prior to the engine coming to rest in an engine stop position, and the equilibrium aircharge may be an expected or modeled aircharge in the cylinder when a pressure of in the cylinder is equal to crankcase pressure. Thus, a value of the estimated aircharge decreases (if above equilibrium) or increases (if below equilibrium), and the aircharge of the cylinder gets closer to the equilibrium aircharge as the duration of the auto-stop increases. Further, the aircharge of the cylinder may reach the equilibrium aircharge after a threshold duration is reached, the threshold duration determined based in part on a decay time constant, for example. As an example, the controller may determine the corrected aircharge of the cylinder based on the initial aircharge of the cylinder, the equilibrium aircharge of the cylinder, the duration of the auto-stop, and the decay time constant. Additionally or alternatively, the controller may determine the corrected aircharge of the cylinder upon receiving the request to restart the engine by adjusting the initial aircharge for the aircharge variation that may occur prior to the engine coming to rest in the engine stop position (e.g., a first aircharge variation) and modeling further aircharge variation (e.g., a second aircharge variation) from the adjusted initial aircharge toward the equilibrium aircharge based on the duration of the auto-stop and the decay time constant.

As another example, correcting the aircharge of the cylinder based on the duration of the auto-stop includes determining a pressure change in the cylinder over the duration of the auto-stop. For example, the pressure change may occur from a first pressure in the cylinder, corresponding to a pressure in the cylinder when the engine reaches the stop position, toward a crankcase pressure. The first pressure may be measured or estimated based on the intake manifold pressure at the final intake valve closing of the cylinder during the auto-stop or directly measured when the engine reaches the stop position, for example. Further, in some examples, the pressure change from the first pressure may be determined based on the duration of the auto-stop and the decay time constant or based on a second pressure measured in the cylinder when the request to restart the engine from the auto-stop is received. Because the volume in the cylinder does not change while the engine is in the stop position, the pressure change in the cylinder over the duration of the auto-stop may directly relate to aircharge variation in the cylinder over the duration of the auto-stop.

By correcting the aircharge of the cylinder used for determining the fuel mass for a combustion restart, which may be an expansion combustion restart, a desired air-fuel ratio for the combustion restart may be more accurately produced. As a result, the combustion restart may more reliably produce an expected amount of torque and decrease usage of a starter motor. Further, the combustion restart may be robustly performed over a range of engine-off durations. Overall, both starter motor wear and engine restart times may be decreased. By decreasing the engine restart time and decreasing starter motor wear, customer satisfaction may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
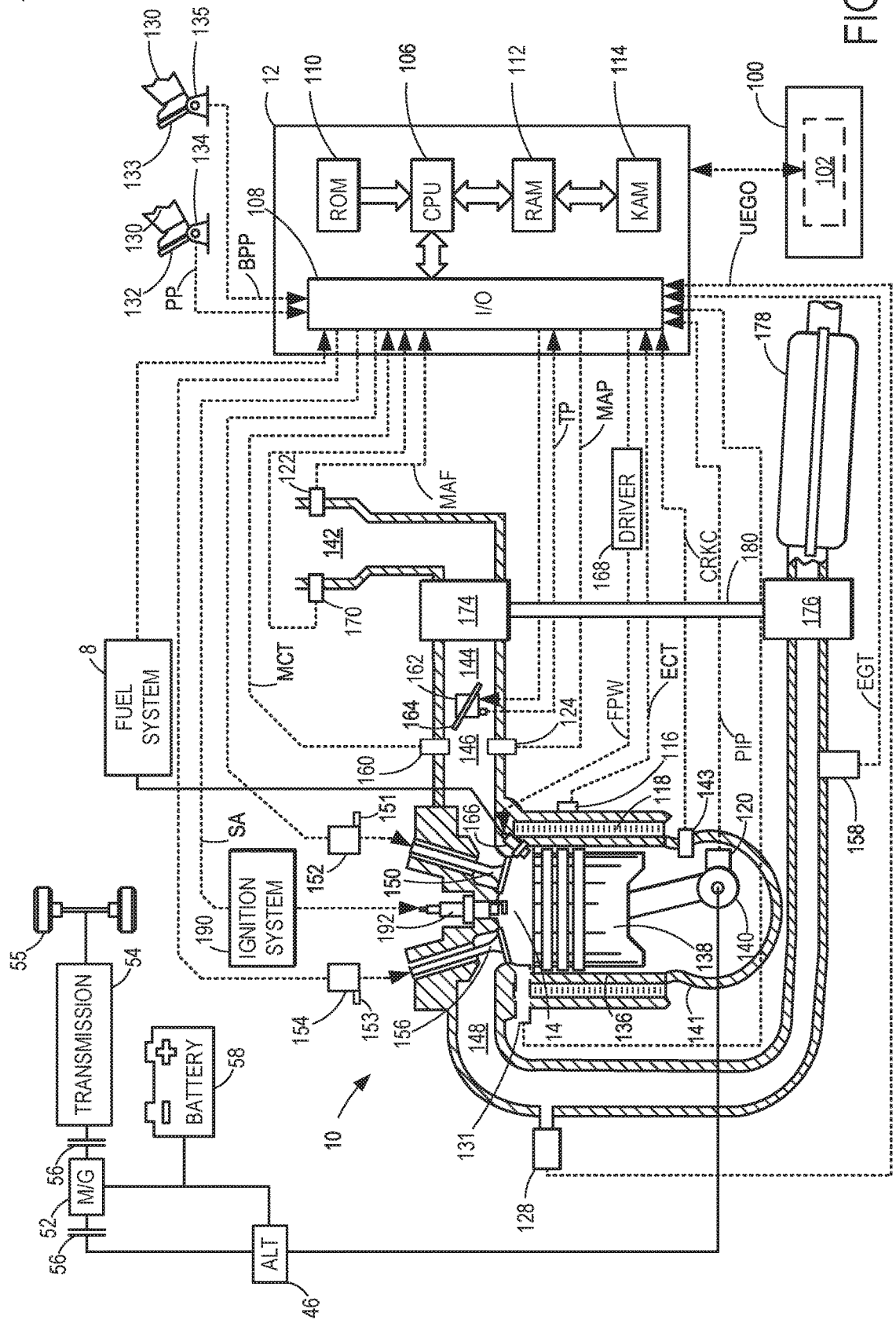
FIG. 1 shows a schematic depiction of an example vehicle system.

The following description relates to systems and methods for operating an engine of a vehicle, such as the engine of the example vehicle depicted in FIG. 1. In particular, the vehicle may be a start-stop or hybrid vehicle, wherein the engine is frequently shut down and restarted by a controller. A combustion event, such as an expansion combustion event, may be used in order to quickly restart the engine while reducing wear on a starter motor. The controller may determine an amount of fuel to provide for the combustion event by tracking aircharge variation that occurs while the engine is shutdown, such as according to the method of FIG. 2 and as diagrammed in FIG. 3. FIGS. 4A and 4B show interrelated example timelines for performing an expansion combustion-assisted restart by tracking the aircharge variation in a cylinder stopped in an expansion stroke. In this way, the amount of fuel provided for the combustion event may more accurately produce a desired air-fuel ratio, thereby increasing a robustness of the combustion-assisted restart.

Turning now to the figures, FIG. 1 depicts an example embodiment of a cylinder 14 of an internal combustion engine 10, which may be included in a vehicle 5. Engine 10 may be controlled at least partially by a control system, including a controller 12, and by input from a vehicle operator 130 via an accelerator pedal 132 and an accelerator pedal position sensor 134 and via a brake pedal 133 and a brake pedal position sensor 135. The accelerator pedal position sensor 134 may send a pedal position signal (PP) to controller 12 corresponding to a position of accelerator pedal 132, and the brake pedal position sensor 135 may send a brake pedal position (BPP) signal to controller 12 corresponding to a position of brake pedal 133. Cylinder (herein, also "combustion chamber") 14 of engine 10 includes combustion chamber walls 136 with a piston 138 positioned therein. Piston 138 is coupled to a crankshaft 140 so that reciprocating motion of the piston is translated into rotational motion of the crankshaft. As used herein, the phrases "rotating the engine" and "spinning the engine" refer to crankshaft 140 rotating about its central axis. Further, "spinning down" and "pulling down" the engine refer momentum of the engine continuing to rotate crankshaft 140 after combustion is discontinued in engine 10 until the engine speed reaches zero. Similarly, "spinning up" and "pulling up" the engine refers to increasing the engine speed from zero to start (or restart) engine 10. Crankshaft 140 may be positioned in a crankcase 141 and coupled to at least one vehicle wheel 55 of vehicle 5 via a transmission 54, as further described below.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. In some embodiments, electric machine 52 enables a starting operation of engine 10 while in other embodiments, a dedicated starter motor is additionally or alternatively included. The powertrain may be configured in various manners including as a parallel, a series, or a series-parallel hybrid vehicle.

Vehicle 5 may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46. Further, in some examples, system battery 58 may include one or more batteries, such as a primary battery and a secondary battery, in which one of the primary and secondary batteries is a traction battery and the other is a SLI battery.

Alternator 46 may be configured to charge system battery 58 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 14 of engine 10 can receive intake air via a series of intake air passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen sensor, as depicted), a two-state oxygen sensor or EGO, a HEGO (heated EGO), a NOx, a HC, or a CO sensor, for example. Emission control device 178 may be a three-way catalyst, a NOx trap, various other emission control devices, or combinations thereof. In the example of FIG. 1, emission control device 178 is a three-way catalyst configured to reduce NOx and oxidize hydrocarbons and CO.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors 151 and 153.

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each valve actuator may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. In other examples, spark may be provided at a timing retarded from MBT to maintain a spark-based torque reserve, such as during part-load operation. Controller 12 may input engine operating conditions, including engine speed, engine load, and exhaust gas AFR, into a look-up table and output a corresponding spark timing for the input engine operating conditions.

Each cylinder of engine 10 may be configured with one or more fuel injectors for providing fuel thereto. As a non-limiting example, cylinder 14 is shown including a fuel injector 166. Fuel injector 166 is configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternative example, fuel injector 166 may be arranged in an intake port rather than coupled directly to cylinder 14 in a configuration that provides what is known as port injection of fuel (hereafter also referred to as "PFI") into the intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus.

Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a manifold charge temperature (MCT) from an intake manifold temperature sensor 160; an exhaust gas temperature (EGT) from a temperature sensor 158 coupled to exhaust passage 148; ambient conditions from an ambient sensor 170, which may sense one or more of ambient (e.g., atmospheric) pressure, ambient temperature, and ambient humidity; a profile ignition pickup signal (PIP) from a Hall effect sensor 120 (or other type) coupled to crankshaft 140; a crankcase pressure signal CRKC from a crankcase pressure sensor 143 coupled to crankcase 141; throttle position (TP) from a throttle position sensor; signal UEGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158. Further, a cylinder pressure sensor 131 is optionally coupled to cylinder 14. When included, cylinder pressure sensor 131 provides controller 12 with a direct measurement of a pressure inside of cylinder 14.

Controller 12 receives signals from the various sensors of FIG. 1 and employs the various actuators of FIG. 1 to adjust engine operation based on the received signals and instructions stored on a memory of the controller. For example, controller 12 and/or controller 102 may receive signal PP from pedal position sensor 134 and signal BPP from brake pedal position sensor 135 and determine when to shut down and restart the engine, as will be elaborated below with respect to FIG. 2.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Furthermore, vehicle 5 may include a start-stop system 100. Start-stop system 100 may comprise a controller 102 configured to determine when to auto-stop (e.g., shut down) and auto-start (e.g., restart) engine 10 during vehicle operation, such as when a pre-determined start-stop condition is satisfied. As an example, controller 102 may be configured to autonomously shut down engine 10 while engine 10 is idling and vehicle 5 is stationary, in what is referred to herein as a static start-stop. As another example, additionally or alternatively, controller 102 may be configured to autonomously shut down engine 10 while engine 10 is idling and vehicle 5 is in motion, in what is referred to herein as a rolling start-stop. Once the engine is auto-stopped, controller 102 may restart engine 10 in response to a torque request from vehicle operator 130. Additional conditions for performing auto-stops and auto-starts will be described below with respect to FIG. 2. Controller 102 may be a dedicated controller of start-stop system 100 that is communicatively coupled to controller 12. Alternatively, controller 102 may be omitted, and controller 12 may be configured to determine when to shut down and restart engine 10, for example. In still other examples, controller 102 may be included in another engine control unit or powertrain control module that is communicatively coupled to controller 12 or may be included in (e.g., a sub-component of) controller 12.

However, continually shutting down and restarting the engine while the vehicle is on may increase wear on an electric motor that provides torque for starting the engine (e.g., electric machine 52). Therefore, combustion may be performed to provide torque for starting (or assisting in starting) the engine. As one example, expansion combustion includes directly injecting fuel into any cylinder stopped in the expansion stroke (e.g., via fuel injector 166) and igniting the fuel (e.g., via spark plug 192) to generate a downward piston force via combustion. In some examples, the expansion combustion alone is used for restarting the engine. In other examples, the expansion combustion is used in addition to electric motor torque, thereby decreasing an amount of torque provided by the electric motor for restarting the engine. By performing the expansion combustion, wear on the electric motor is decreased. However, whether the expansion combustion is used alone or in addition to the electric motor torque, an air mass in the cylinder varies (e.g., decreases) while the engine is shutdown, and thus, an amount of torque produced by the expansion combustion may be unpredictable.

Figure 2:
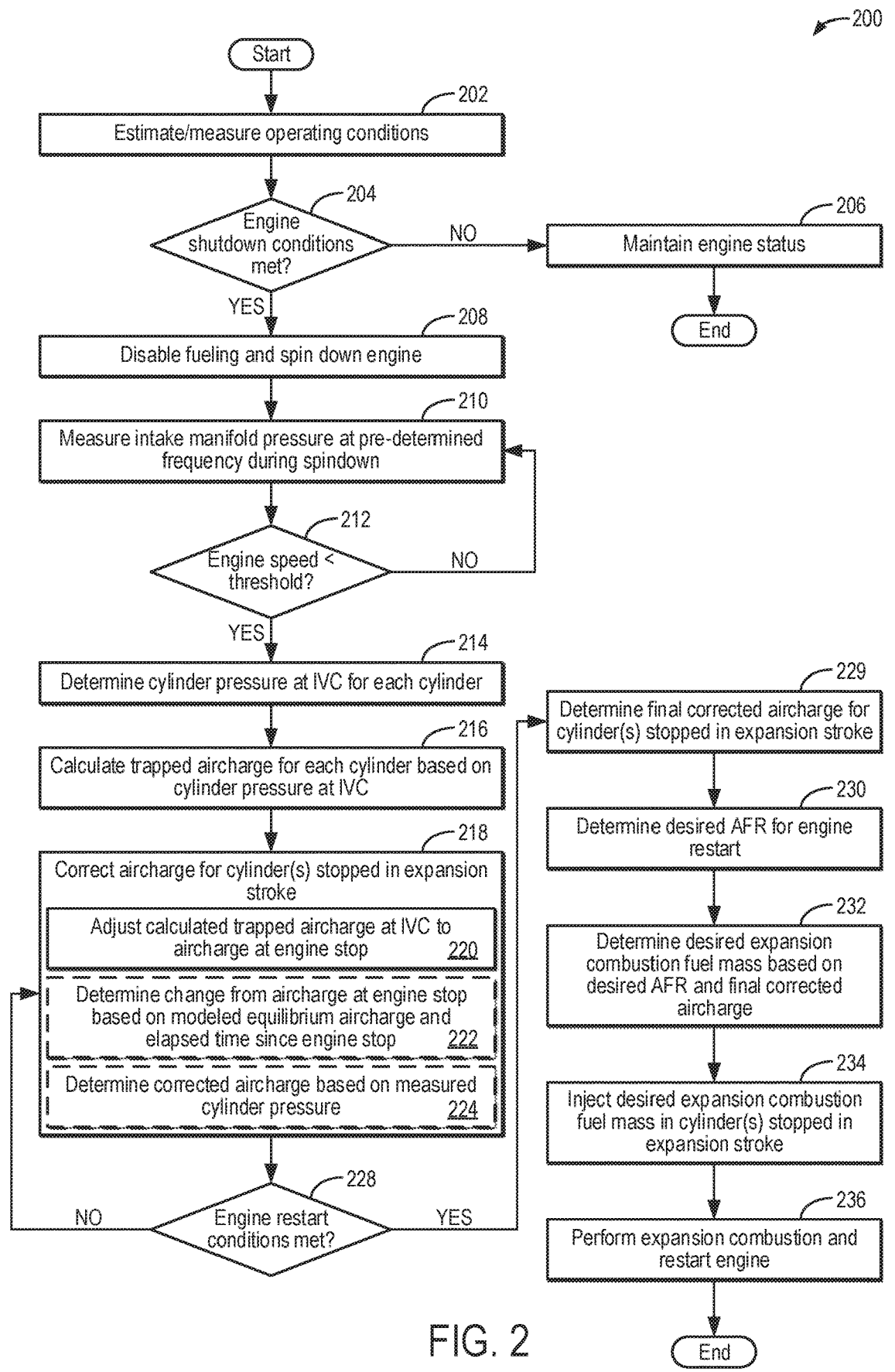
FIG. 2 is a flow chart of an example method for determining an aircharge in a cylinder for performing combustion to restart an auto-stopped engine and fueling the cylinder accordingly.

Therefore, FIG. 2 shows an example method 200 for performing an expansion combustion to provide torque to start or assist in starting an engine, which may be included in a start-stop or hybrid vehicle (e.g., vehicle 5 shown in FIG. 1). In particular, method 200 includes a routine for more accurately determining an amount of air trapped in a cylinder stopped on the expansion (e.g., power) stroke, thereby enabling more accurate AFR control of the expansion combustion. Instructions for carrying out method 200 may be executed by a controller (e.g., controller 12 and/or controller 102 of FIG. 1) based on instructions stored on a memory of the controller and in conjunction with signals received from sensors of the engine system, such as the sensors described above with reference to FIG. 1 (e.g., accelerator pedal position sensor 134, brake pedal position sensor 135, and intake valve position sensor 151 of FIG. 1). The controller may employ actuators of the engine system, such as fuel injector 166 of FIG. 1, to adjust engine operation according to the method described below.

At 202, method 200 includes estimating and/or measuring operating conditions. Operating conditions may include, for example, vehicle speed, a state of charge (SOC) of a system battery (e.g., system battery 58 of FIG. 1), engine status (e.g., "on," with combustion occurring in engine cylinders, or "off," with combustion discontinued), engine load, engine temperature, engine speed, intake manifold pressure, manifold charge temperature, crankcase pressure, intake and exhaust valve timings and positions, driver-demanded torque, etc. The operating conditions may further include ambient conditions, such as ambient temperature, ambient humidity, and atmospheric (e.g., barometric) pressure. The operating conditions may be directly measured or inferred based on available data. For example, the SOC may be inferred as a percentage charge of a total charge capacity. As another example, the engine temperature may be determined from a signal ECT received from an engine coolant temperature sensor (e.g., engine coolant temperature sensor 116 of FIG. 1). As still another example, the intake manifold pressure (e.g., MAP) may be measured by a MAP sensor (e.g., MAP sensor 124 of FIG. 1). As yet another example, the driver-demanded torque may be determined from a combination of an accelerator pedal position or displacement (e.g., as measured by the accelerator pedal position sensor) and a brake pedal position or displacement (e.g., as measured by the brake pedal position sensor).

At 204, it is determined if engine shutdown conditions are met. For example, an engine shutdown may be requested for an idle-stop, wherein the engine is shut down while the vehicle remains on and at rest (e.g., for a static start-stop) or coasting (e.g., for a rolling start-stop). As another example, the engine shutdown may be requested to transition the vehicle from operating in an engine mode (where torque to propel the vehicle is at least partially provided by the engine) to operating in an electric mode (where torque to propel the vehicle is provided by an electric motor, such as electric machine 52 shown in FIG. 1, and not by the engine). The engine shutdown conditions may include, for example, the battery SOC being above a threshold SOC and the driver-demanded torque being less than a threshold torque. The threshold SOC may be defined as a battery charge level below which the battery may not be able to support or execute additional vehicle functions while the engine is off and/or may be unable to provide enough power to restart the engine. As one non-limiting example, the threshold SOC is 30%.

The threshold torque may vary based on whether the engine shutdown is requested for an idle-stop or for transitioning to the electric mode of operation. For example, the threshold torque may be a positive, non-zero amount of driver-demanded torque that the electric motor is able to meet and/or sustain when the engine shutdown is requested for transitioning to the electric mode of operation. The electric motor may not be able to meet or sustain torque levels above the threshold torque, for example. In contrast, the threshold torque may be lower when the engine shutdown is requested for a static start-stop or a rolling start-stop, such as a torque amount corresponding to a neutral (e.g., undepressed) accelerator pedal position.

As another example, the engine shutdown conditions may additionally or alternatively include the vehicle speed being less than a threshold speed. Similar to the threshold torque, the threshold speed may vary based on whether the engine shutdown is requested for an idle-stop or for transitioning to the electric mode of operation. For example, the threshold vehicle speed may be lower (e.g., in a range from 0-5 mph) when the engine shutdown is requested for an idle-stop and higher (e.g., in a range from 10-30 mph) when the engine shutdown is requested for transitioning to the electric mode of operation. As still another example, the engine shutdown conditions may include the engine idling for longer than a first threshold duration, such as when the engine shutdown is requested for an idle-stop. The first threshold duration refers to a non-zero time duration, such as a duration in a range from 1-10 seconds, of the engine operating at idle speed. The engine shut down conditions may further include the engine currently being on (and not already off).

All of the engine shutdown conditions for the corresponding shutdown request (e.g., for an idle-stop or for transitioning to electric mode) may be confirmed for an engine shutdown to be initiated. Both shutting down the engine for an idle-stop and shutting down the engine for transitioning to the electric mode of operation may be referred to herein as an engine auto-stop, as the engine is shut down automatically by the controller and without a request from the driver.

If the engine shutdown conditions are not met (e.g., one of the engine shutdown conditions is not met), method 200 proceeds to 206 and includes maintaining the engine status. For example, if the engine is on, fuel and spark will continue to be provided to the engine cylinders to produce combustion torque. If the engine is off, fuel and spark will remain disabled so that combustion does not occur in the engine cylinders. Following 206, method 200 ends. For example, method 200 may be repeated at a pre-determined frequency or responsive to a detected change in operating conditions.

Returning to 204, if the engine shutdown conditions are met, method 200 proceeds to 208 and includes disabling fueling and spinning down the engine. Disabling fueling includes no longer injecting fuel (and no longer providing spark) in the engine so that combustion ceases. After the fueling is discontinued, the engine continues to rotate due to inertia for a short period, a process referred to herein as spindown (or rundown). During spindown, the engine speed decreases until reaching a speed of zero, at which time the engine is fully stopped. Further, in some examples, the stop position may be controlled to place at least one cylinder at a desired position for an expansion combustion event. For example, the stop position may be controlled using one or more of a throttle position, cylinder valve timing and lift adjustments, a load of an alternator, and positioning via the electric motor. In one example, the electric motor may be actuated by braking or motoring the engine both during the stop process and after the engine has come to rest. The desired position may be calibrated for optimizing work on the piston by an expansion combustion event, for example.

At 210, method 200 includes measuring the intake manifold pressure at a pre-determined frequency during the spindown. The pre-determined frequency dictates how often the measurement is performed during a defined amount of time. The pre-determined frequency may include obtaining a plurality of intake manifold pressure measurements per second so that changes in the intake manifold pressure during the spindown are accurately recorded. As one example, the pre-determined frequency includes obtaining one measurement every millisecond. The controller may continue to measure the intake manifold pressure at the pre-determined frequency until the spindown is complete and the engine is stopped (e.g., with a speed of zero), and a final intake manifold pressure measurement may be obtained. As one example, the controller may store each intake manifold pressure measurement in working memory (e.g., random access memory 112 of FIG. 1) according to the crank angle and time at which it is recorded, such as in a table or graph.

At 212, it is determined if the engine speed is less than a threshold speed. The threshold speed refers to a speed below which the engine is approaching engine stop and is not expected to rotate through another full engine cycle (e.g., two rotations of the crankshaft). If the engine speed is not less than the threshold speed, method 200 returns to 210, and the controller continues to measure the intake manifold pressure at the pre-determined frequency as the engine continues to spin down.

If the engine speed is less than the threshold speed, method 200 proceeds to 214 and includes determining a cylinder pressure at intake valve closing (IVC) for each cylinder. Because the engine is not expected to substantially rotate after the engine speed decreases below the threshold speed, the cylinder pressure at IVC provides an initial cylinder pressure value while the engine finishes spinning down to rest. The controller may determine the cylinder pressure at IVC for each cylinder based on the intake manifold pressure measurement obtained at (or the nearest measurement obtained to) an intake valve closing timing of the cylinder. For example, the controller may use the recorded intake manifold pressure measurement that is closest to the intake valve closing timing of the corresponding cylinder. For example, the cylinder pressure at IVC may be substantially equal to the intake manifold pressure measured at IVC.

At 216, method 200 includes calculating a trapped aircharge for each cylinder based on the cylinder pressure at IVC (e.g., as determined at 214). For example, assuming that a cylinder valve (e.g., an exhaust valve) does not open before engine stop is reached, the aircharge trapped within the cylinder at IVC provides an initial air mass that may decrease while the engine is stopped (e.g., due to pressure equalization between the cylinder and a crankcase of the engine, as will be elaborated below at 218). For a given cylinder, the trapped aircharge (or air mass) may be determined as a function of the cylinder pressure at IVC, the engine temperature, the manifold charge temperature, and a cylinder volume at IVC. As an example, the controller may input the cylinder pressure at IVC, the engine temperature, the manifold charge temperature, and the cylinder volume at IVC into a look-up table, algorithm, or function, which may output the corresponding trapped aircharge. As another example, the controller may determine the trapped aircharge using logic rules that are a function of the cylinder pressure at IVC, the engine temperature, the manifold charge temperature, and the cylinder volume at IVC. Further, the cylinder volume at IVC may be determined based on a piston position at IVC and a geometry of the engine. As an example, the controller may input the engine position corresponding to the intake valve closing timing into a look-up table or graph, which may output the cylinder volume at IVC. For example, intake valve closing timings closer to BDC result in larger cylinder volumes than intake valve closing timings further from BDC, and larger cylinder volumes result in a larger aircharge than smaller volumes for a given cylinder pressure.

At 218, method 200 includes correcting the aircharge for the cylinder(s) stopped in the expansion (e.g., power) stroke. For example, as soon as the intake valve closes, the cylinder pressure begins to equalize with the crankcase of the engine due to leakage past cylinder seals, such as piston rings. Thus, correcting the aircharge for the cylinder(s) stopped in the expansion stroke includes adjusting (e.g., updating) the calculated trapped aircharge at IVC to an aircharge at engine stop, as indicated at 220. As the cylinder pressure changes between IVC and the engine speed reaching zero, the aircharge also varies. The controller may determine an adjustment factor that models this increase or decrease in the cylinder air mass as a function of the engine temperature and engine age, for example. As an example, as the engine age increases, the cylinder seals may become degraded, resulting in a faster rate of air mass variation. The controller may determine the engine age based on a date of manufacture stored in memory compared with a current date, for example. As another example, the controller may additionally take into account any maintenance performed on the cylinder seals by accessing a maintenance log. Additionally or alternatively, the controller may model the variation based on the cylinder pressure at engine stop, which may increase or decrease from the cylinder pressure at IVC as the piston position, and thus the volume of the cylinder, changes. The change in the cylinder air mass between IVC and the engine reaching the stop position may comprise a first aircharge variation.

For each cylinder stopped in the expansion stroke, the controller may multiply the trapped aircharge (e.g., as calculated at 216) by the adjustment factor to determine the aircharge at engine stop. As another example, the controller may subtract the first aircharge variation from the trapped aircharge to determine the aircharge at engine stop for each cylinder stopped in the expansion stroke.

In some examples, correcting the aircharge for the cylinder(s) stopped in the expansion stroke further includes determining a change from the aircharge at engine stop based on a modeled equilibrium aircharge and an elapsed time since engine stop, as optionally indicated at 222. Over time, the cylinder pressure will shift toward the crankcase pressure in order to achieve equilibrium with the crankcase. Therefore, the equilibrium aircharge may be modeled based on the cylinder volume at engine stop, the engine temperature, and the crankcase pressure. For example, the controller may estimate the equilibrium aircharge using the Ideal Gas Law, which relates the amount (e.g., mass), volume, pressure, and temperature of a gas. Further, the cylinder volume at engine stop may be determined based on the engine position at engine stop and the engine geometry, such as in the manner described above at 216 for determining the cylinder volume at IVC.

Because the cylinder volume remains constant and the cylinder pressure changes over time while the engine is off, the cylinder aircharge increases (if less than the crankcase pressure) or decreases (if greater than the crankcase pressure) toward the equilibrium aircharge over time. Therefore, the controller may model the change from the aircharge at engine stop (e.g., a second aircharge variation) based on a duration since engine stop (e.g., since the engine speed reached zero) and the equilibrium aircharge using a look-up table, algorithm, or function, and correct the cylinder aircharge accordingly. As one example, the controller may update the cylinder aircharge using the following equation:

$$m_{aircharge} = m_{stopped} + (m_{equilibrium} - m_{stopped}) \times t/(\tau+t) \quad \text{(Equation 1)}$$

where $m_{aircharge}$ is the corrected cylinder aircharge, $m_{stopped}$ is the cylinder aircharge at engine stop (e.g., as determined at 220), $m_{equilibrium}$ is the modeled equilibrium aircharge, $t$ is the duration since engine stop, and $\tau$ is a first-order decay time constant that is a function of the engine temperature and the engine age. It may be understood that the first-order decay time constant models both decreases in the aircharge (e.g., from a higher initial aircharge toward a lower equilibrium aircharge) and increases in the aircharge (e.g., from a lower initial aircharge toward a higher equilibrium aircharge).

Additionally or alternatively, the controller may model the change from the aircharge at engine stop by modeling a pressure change in the cylinder since engine stop. For example, the pressure in the cylinder changes from the cylinder pressure at engine stop, which is adjusted from the cylinder pressure at IVC, toward crankcase pressure. The pressure in the cylinder will reach the crankcase pressure once a second threshold duration has elapsed since engine stop. For example, the second threshold duration may vary based on the cylinder pressure at engine stop, the engine temperature, and the engine age. As an example, as the engine age increases and the cylinder seals become more degraded, the second threshold duration may decrease (e.g., it takes less time for the cylinder to reach equilibrium with the crankcase). Therefore, the controller may determine the second threshold duration for each engine auto-stop event by inputting the cylinder pressure at engine stop, the engine temperature, and the engine age into a look-up table or function, which may output the second threshold duration for reaching the crankcase pressure during the auto-stop. As such, when the duration since engine stop surpasses the second threshold duration, the cylinder pressure is estimated to be at the crankcase pressure. Conversely, when the duration since engine stop is less than the second threshold duration, the cylinder pressure is not equal to the crankcase pressure.

As an example, the controller may generate a pressure change curve or function based on the cylinder pressure at engine stop and the first-order decay constant described above, and the pressure change curve or function may relate the projected pressure in the cylinder to time. Therefore, the cylinder may input the duration since engine stop into the pressure change curve, which may output the corresponding decreased pressure of the cylinder for the given duration.

In other examples, correcting the aircharge for the cylinder(s) stopped in the expansion stroke further includes determining the corrected aircharge based on a measured cylinder pressure, as optionally indicated at 224. For example, when the cylinder pressure can be directly measured via a cylinder pressure sensor (e.g., cylinder pressure sensor 131 of FIG. 1), the controller may directly estimate the cylinder aircharge using the measured cylinder pressure, the cylinder volume, and the engine temperature via the Ideal Gas Law.

Whether the corrected aircharge for the cylinder(s) stopped in the expansion stroke is determined by modeling and correcting for the aircharge variation (e.g., at 222) or by directly measuring cylinder pressure changes (e.g., at 224), at 228, method 200 includes determining if engine restart conditions are met. The engine restart conditions may include, for example, the driver-demanded torque increasing above the threshold torque (as defined above at 204), such as due to the driver tipping in, or the battery SOC dropping below the threshold SOC (as also defined above at 204). In some examples, any or all of the engine restart conditions may be confirmed for an engine restart to be requested and initiated. Restarting the engine both after an idle-stop and for transitioning to the engine mode of operation may be referred to herein as an engine auto-start, as the engine is restarted automatically by the controller and without a request from the driver.

If the engine restart conditions are not met, method 200 returns to 218 and continues correcting the aircharge for the cylinder(s) stopped in the expansion stroke. For example, the corrected aircharge may be updated continually or at a predetermined frequency, such as every second or fraction of a second (e.g., 10 ms). As another example, additionally or alternatively, the corrected aircharge may be updated responsive to a change in the measured cylinder pressure, when available, or responsive to a measured change in the engine temperature. As still another example, the corrected aircharge may not be updated until the engine restart conditions are met. By correcting the aircharge for the cylinder(s) stopped in the expansion stroke by modeling and/or tracking cylinder pressure/air mass changes that occur while the engine remains off during an auto-stop, the aircharge in the cylinder(s) may be determined with increased accuracy.

If the engine restart conditions are met, method 200 proceeds to 229 and includes determining a final corrected aircharge for the cylinder(s) stopped in the expansion stroke. The final corrected aircharge refers to an aircharge in the cylinder for the expansion combustion for restarting the engine. In some examples, the controller may determine the corrected aircharge over time during the auto-stop and use the most recently updated value as the final corrected aircharge. In other examples, the controller may calculate or re-calculate the final corrected aircharge upon receiving the request to restart the engine (e.g., responsive to the engine restart conditions being met). For example, the controller may determine a change in the cylinder pressure, and thereby a change in the cylinder aircharge, that has occurred over the duration since engine stop (e.g., a duration of the auto-stop, from the engine speed reaching zero to the engine restart request being received), and use this value to determine the corrected cylinder aircharge to use for the expansion combustion. The change in the cylinder pressure may be determined based on the cylinder pressure at engine stop (e.g., a first cylinder pressure) and the cylinder pressure when the engine restart request is received (e.g., a second cylinder pressure). The cylinder pressure at engine stop may be estimated and/or modeled or directly measured via the cylinder pressure sensor, as described above. As another example, upon receiving the engine restart request, the controller may determine the final corrected cylinder aircharge to use for the expansion combustion based on the second aircharge variation that occurs between the cylinder aircharge at engine stop and the cylinder aircharge when the engine restart is requested using Equation 1 described above (e.g., at 222).

Additionally or alternatively, when the duration since engine stop is greater than the second threshold duration, the controller may not directly determine the final corrected aircharge based on the duration since engine stop, but may set the final corrected aircharge as the equilibrium aircharge. Thus, the final corrected aircharge is the same whether the duration since engine stop is greater than the second threshold duration by a small amount or a large amount. Conversely, when the duration since engine stop is less than the second threshold duration, the controller may directly use the duration in determining the corrected aircharge, as described above, because the aircharge in the cylinder varies over the duration until the second threshold duration is reached.

At 230, method 200 includes determining a desired AFR for engine restart. The desired AFR for engine restart refers to a desired AFR for performing expansion combustion to restart (or at least assist in restarting) the engine. The desired AFR for engine restart may be determined as a function of the engine temperature, a fuel rail pressure, and the engine position. As an example, the controller may input the engine temperature, the fuel rail pressure, and the engine position into a look-up table, algorithm, or map, which may output the desired AFR for the expansion combustion for restarting the engine. As another example, the controller may use logic rules that are a function of the engine temperature, the fuel rail pressure, and the engine position to determine the desired AFR for restarting the engine. As an example, the desired AFR for the expansion combustion generally may be richer for a colder engine and for a lower fuel rail pressure.

At 232, method 200 includes determining a desired expansion combustion fuel mass based on the desired AFR and the final corrected aircharge. The desired expansion combustion fuel mass is a fuel mass that will produce the desired AFR given the final corrected aircharge of the cylinder(s) stopped in the expansion stroke. Thus, when more than one cylinder is stopped in the expansion stroke, the desired expansion combustion fuel mass may be different for each cylinder. For example, the controller may divide the final corrected cylinder aircharge determined above at 229 by the desired AFR to determine the desired expansion combustion fuel mass for a given cylinder stopped in the expansion stroke.

At 234, method 200 includes injecting the desired expansion combustion fuel mass in the cylinder(s) stopped in the expansion stroke. For example, the controller may actuate the fuel injector of the corresponding cylinder with the desired expansion combustion fuel mass determined for that cylinder, such as by transmitting a command signal having a pulse-width corresponding to the desired expansion combustion fuel mass to the fuel injector (e.g., signal FPW shown in FIG. 1). As an example, when the aircharge in the cylinder decreases during the auto-stop due to the cylinder pressure being greater than the crankcase pressure, as the time since engine stop increases, the pulse-width of the fuel injection signal may generally decrease due to the decreasing aircharge. As another example, when the aircharge in the cylinder increases during the auto-stop due to the cylinder pressure being less than the crankcase pressure, the pulse-width of the fuel injection signal may generally increase as the time since engine stop increases due to the increasing aircharge. The injected expansion combustion fuel mass mixes with the trapped aircharge, forming an air-fuel mixture.

At 236, method 200 includes performing the expansion combustion and restarting the engine. Performing the expansion combustion includes actuating a spark plug of each cylinder stopped in the expansion stroke, such as via a spark advance signal sent to an ignition system (e.g., ignition system 190 of FIG. 1). Actuating the spark plug ignites the air-fuel mixture within each cylinder stopped in the expansion stroke, producing a combustion event that applies force to the piston to rotate the engine. In some examples, the electric motor may provide additional torque to the crankshaft to rotate the engine to a starting speed. However, by performing the expansion combustion, an amount of electric motor torque used to reach the starting speed may be decreased compared with using the electric motor alone (e.g., without expansion combustion) and compared with performing the expansion combustion at an inaccurate AFR (e.g., when cylinder pressure/aircharge variation is not accounted for). Restarting the engine further includes commencing combustion in every engine cylinder upon reaching the desired starting speed. For example, fuel delivery may be resumed to every engine cylinder with a nominal fuel injection timing (e.g., during the compression stroke), and spark may be provided via spark plugs (e.g., near an end of the compression stroke) to produce combustion torque. After 236, method 200 ends.

In this way, the engine may be quickly restarted from an auto-stop with decreased (or no) electric motor torque. By tracking variation in the trapped aircharge in the cylinder(s) stopped in the expansion stroke over time while the engine is auto-stopped, an accuracy of the expansion combustion fueling is increased. By adjusting the fuel mass injected for the expansion combustion to account for cylinder pressure (and thus aircharge) change during engine stop, the air-fuel ratio of the expansion combustion is more accurately controlled, resulting in more robust expansion combustion restarts, decreased electric motor wear, and increased fuel economy.

In an alternative example, method 200 may be adapted for "direct start," where the fuel injection is performed in the compression stroke to rock the engine backward to compress charge on the expansion stroke. In such an example, the aircharge of each cylinder stopped in the compression stroke is additionally or alternatively determined at 218, a desired direct start combustion fuel mass is additionally or alternatively determined for the cylinder(s) stopped in combustion stroke at 232, etc. Thus, the aircharge correction and subsequent fuel injection and combustion event may be performed using the same logic whether for expansion combustion or direct start combustion. Thus, method 200 may be broadly applicable for a restart combustion event, which may be an expansion combustion event or a direct start combustion event.

Figure 3:
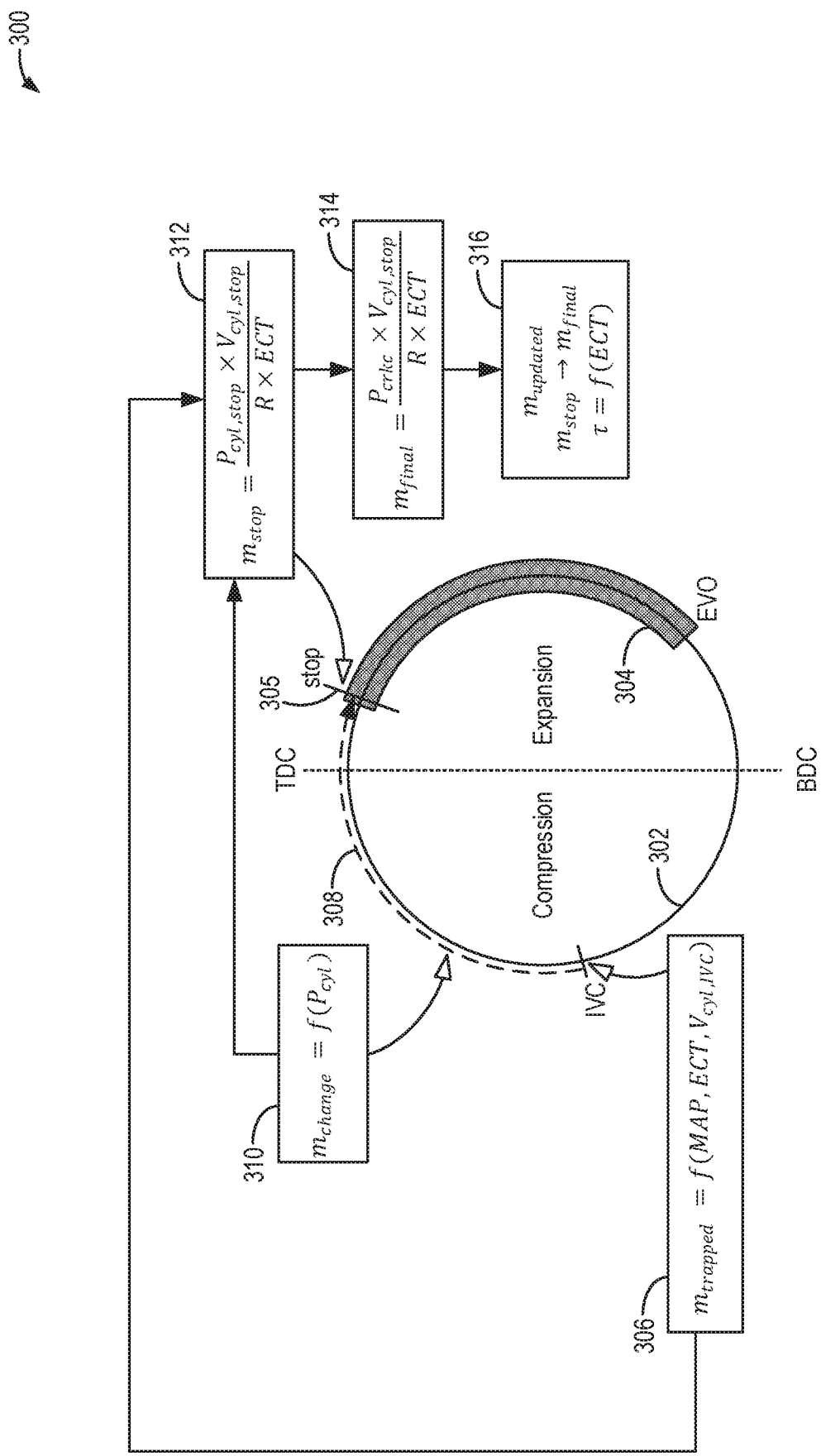
FIG. 3 schematically shows determining an aircharge of a cylinder stopped in an expansion stroke with respect to cylinder valve timings.
Figure 4A:
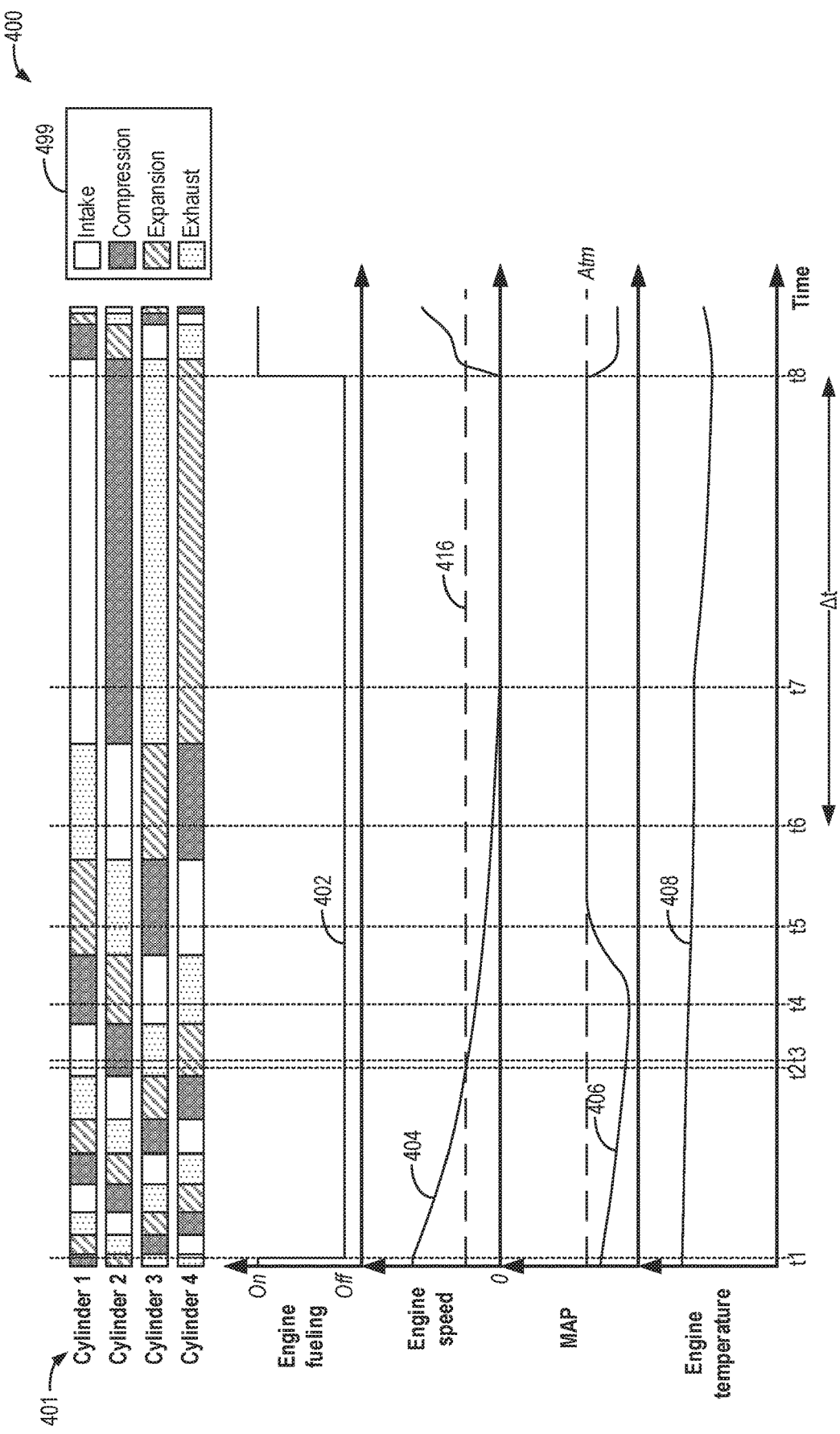
FIGS. 4A and 4B show interrelated prophetic example timelines of determining an aircharge in a cylinder stopped in an expansion stroke for performing an expansion combustion-assisted restart.
Figure 4B:
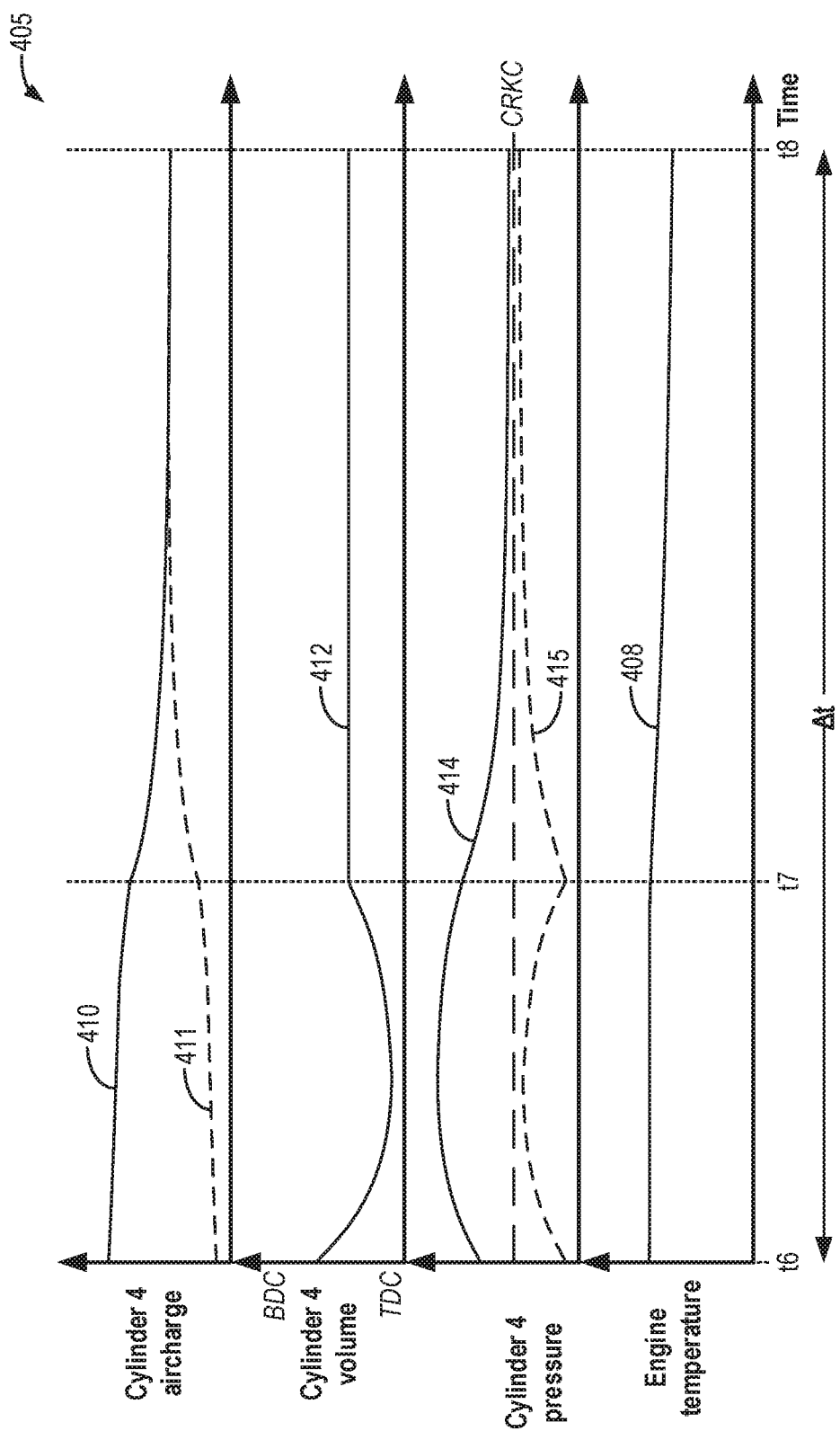

Next, FIG. 3 shows an example schematic diagram 300 of determining an aircharge of a cylinder stopped in the expansion stroke, such as according to method 200 of FIG. 2 detailed above. In particular, diagram 300 depicts various aircharge parameters that are determined relative to a valve timing diagram 302 of the cylinder, which shows the compression stroke and the expansion stroke (and not the intake stroke or the exhaust stroke). Valve timing diagram 302 shows intake valve closing (IVC) during the compression stroke at a timing that is closer to BDC than TDC and exhaust valve opening (EVO) during the expansion stroke at a timing that is closer to BDC than TDC. In the example of FIG. 3, an expansion combustion region 304 between approximately 20 degrees after TDC and EVO defines a range of engine positions at engine stop that support expansion combustion for engine start. However, in other examples, the expansion combustion region 304 may be larger (e.g., comprising a greater crank angle range) or smaller (e.g., comprising a smaller crank angle range) and may vary based on a geometry of the engine and engine temperature, for example. The expansion combustion region 304 may be selected to provide sufficient air in the cylinder for an expansion combustion event to produce enough torque to rotate the engine.

A trapped aircharge ($m_{trapped}$) 306 is determined at a final IVC as the engine spins down to rest. As elaborated above at 216 of FIG. 2, the trapped aircharge 306 is a function of intake manifold pressure (MAP), engine temperature (ECT), and a volume of the cylinder at IVC ($V_{cyl,IVC}$), which is itself a function of the engine position (and thus the piston position within in the cylinder) at IVC. The trapped aircharge 306 provides a starting (e.g., initial) value for the aircharge in the cylinder, as additional air will not be inducted via the intake valve prior to engine stop.

The engine rotates from the position at IVC prior to engine stop, as shown by a dashed arrow 308. As the engine rotates and as time elapses, the aircharge in the cylinder decreases. An amount of aircharge variation ($m_{change}$) 310 is determined as a function of a pressure in the cylinder ($P_{cyl}$). The pressure in the cylinder may be estimated, such as using the intake manifold pressure at IVC and according to the Ideal Gas Law, or directly measured.

The engine comes to rest at a stop position 305. The stop position 305 is within the expansion combustion region 304. Thus, an aircharge at engine stop ($m_{stop}$) 312 is determined according to the Ideal Gas Law using a pressure of the cylinder at engine stop ($P_{cyl,stop}$), a volume of the cylinder at engine stop ($V_{cyl,stop}$), the ideal gas constant (R), and the engine temperature. The volume of the cylinder at engine stop is a function of the engine position at stop position 305. As mentioned above, the pressure in the cylinder may be estimated or directly measured. Further details regarding determining the aircharge at engine stop 312 are given above with respect to 220 of FIG. 2.

Although the engine does not rotate, time elapsing while the engine is stopped results in the aircharge within the cylinder further increasing or decreasing from the aircharge at engine stop 312 (e.g., a second aircharge variation). In order to model this decrease, an equilibrium aircharge ($m_{final}$) 314 is determined according to the Ideal Gas Law using a crankcase pressure ($P_{crkc}$), the volume of the cylinder at engine stop, the ideal gas constant, and the engine temperature, as elaborated above at 222 of FIG. 2. The equilibrium aircharge 314 represents the final expected aircharge value. As time passes, an updated (e.g., corrected) cylinder aircharge 316 is determined based on the aircharge at engine stop 312 and the equilibrium aircharge 314 using a first-order exponential decay function, for example. A time constant of the first-order exponential decay function ($\tau$) is a function of the engine temperature. As an engine-off duration increases, the updated cylinder aircharge 316 gets closer to the equilibrium aircharge 314 until the engine-off duration surpasses a threshold duration (e.g., the second threshold duration described above with respect to FIG. 2). The updated cylinder aircharge 316 is continually or periodically updated (e.g., at a pre-determined frequency) until an engine start is requested and/or updated responsive to the engine start being requested.

Next, FIGS. 4A and 4B show interrelated timelines 400 (FIG. 4A) and 405 (FIG. 4B) for determining a cylinder aircharge for restarting a four cylinder engine using expansion combustion. In particular, timeline 405 occurs during timeline 400 and includes additional parameters that are not shown in timeline 400. Timeline 400 includes a map 401 showing a stroke of each cylinder (e.g., cylinder 1 cylinder 2, cylinder 3, and cylinder 4) at a given time, with the stroke indicated by different fill patterns according to a legend 499 (e.g., no shading for intake, darker shading for compression, diagonal shading for expansion, and lighter shading for exhaust). Timeline 400 additionally shows engine fueling in a plot 402, engine speed in a plot 404, MAP in a plot 406, and engine temperature in a plot 408. Timeline 405 shows the engine temperature in plot 408 and additionally shows an aircharge of cylinder 4 in a first condition in a plot 410, an aircharge of cylinder 4 in a second condition in a dashed plot 411, a volume of cylinder 4 in a plot 412, a pressure of cylinder 4 in the first condition a plot 414, and a pressure of cylinder 4 in the second condition in a plot 415. The first condition and the second condition differ in that the pressure of cylinder 4 is greater than a crankcase pressure (e.g., represented by a dashed line CRKC) in the first condition and less than the crankcase pressure in the second condition. In the example described below, the pressure of cylinder 4 (plot 414 of timeline 405) is an inferred pressure based on the volume of cylinder 4 (plot 412 of timeline 405) and MAP at intake valve closing, although a directly measured in-cylinder pressure may also be used.

For all of the above plots, the horizontal axis represents time. The vertical axis of each plot represents the labeled parameter. For plot 402, the vertical axis indicates whether engine fueling is "on" (e.g., fuel is provided to at least one cylinder) or "off" (e.g., no fuel is provided to the engine), as labeled. For plots 404, 406, 408, 410, 411412, 414, and 415, a magnitude of the labeled parameter increases along the vertical axis from bottom to top. Further, a threshold engine speed is represented by a dashed line 416 (see FIG. 4A). Further still, MAP (plot 406 of timeline 400) is shown with respect to atmospheric pressure ("Atm"), and the volume of cylinder 4 in plot 412 of timeline 405 is shown with respect to the volume at TDC (e.g., the smallest volume of the cylinder) and the volume at BDC (e.g., the largest volume of the cylinder).

Turning first to timeline 400 shown in FIG. 4A, at time t1, an engine shutdown is requested for an auto-stop, such as described above with respect to method 200 of FIG. 2. In response to the engine shutdown request, engine fueling is discontinued (plot 402). As a result, combustion is discontinued, and the engine speed decreases as the engine is spun down (plot 404). During the spindown, MAP also decreases (plot 406) as suction from the spinning engine increases an amount of vacuum in the intake manifold. The MAP is recorded by a controller, such as controller 12 of FIG. 1, at a pre-determined frequency during the spindown, such as described above at 210 of FIG. 2.

At time t2, the engine speed (plot 404) reaches and then decreases below the threshold engine speed (dashed line 416). In response to the engine speed decreasing below the threshold engine speed, the controller determines a cylinder pressure for each of cylinder 1, cylinder 2, cylinder 3, and cylinder 4 at intake valve closing of the corresponding cylinder based on MAP (plot 406). The intake valve closing timing is near the beginning of the compression stroke for each cylinder. In particular, the intake valve of cylinder 2 closes shortly after time t2 at time t3, the intake valve of cylinder 1 closes at time t4, the intake valve of cylinder 3 closes at time t5, and the intake valve of cylinder 4 closes at time t6. Further, between time t4 and time t5, MAP reaches a minimum and then begins to increase before reaching equilibrium with the atmosphere before time t6 (plot 406). Thus, the MAP value at intake valve closing is different for each cylinder, with cylinder 4 having the greatest pressure at intake valve closing (e.g., the MAP value at time t6 is greater than that at time t3, time t4, and time t5) and cylinder 1 having the lowest pressure at intake valve closing (e.g., the MAP value at time t4 is less than that at time t3, time t5, and time t6).

A time period between time t6 and time t8, represented as Δt, is shown on both timeline 400 of FIG. 4A and timeline 405 of FIG. 4B. In particular, timeline 405 of FIG. 4B shows additional parameters that are used to determine the aircharge of cylinder 4 (plot 410 and dashed plot 411 of timeline 405), although it may be understood that the aircharge of cylinders 1, 2, and 3 may be determined similarly. Timeline 400 of FIG. 4A and timeline 405 of FIG. 4B will be referred to together for describing the time period Δt. As mentioned above, the pressure of cylinder 4 is greater than the crankcase pressure in the first condition (plot 414) and less than in crankcase pressure in the second condition (dashed plot 415). Whether the pressure of cylinder 4, and thus the aircharge of cylinder 4, increases or decreases during the auto-stop depends on the pressure of cylinder 4 relative to the crankcase pressure while the engine is shutdown. Thus, the first condition and the second condition will now be described separately.

Referring first to the first condition, in the example shown in FIG. 4B, the pressure of cylinder 4 (plot 414) increases after intake valve closing at time t6 as the volume of cylinder 4 decreases (plot 412). Further, the engine temperature does not appreciably change between time t6 and time t7. However, even with the intake and exhaust valves of cylinder 4 closed, the aircharge of cylinder 4 decreases by a relatively small amount (plot 410). As described above with respect to FIGS. 2 and 3, a controller may model this decrease in the aircharge (e.g., a first aircharge variation) as a function of the pressure in cylinder 4 (plot 414). As an example, a rate of decrease in the aircharge may be greater as the pressure of cylinder 4 increases.

The engine reaches engine stop at time t7, with the engine speed equal to zero (plot 404 of timeline 400). At engine stop, cylinder 4 is in the expansion stroke (map 401 of timeline 400), while the other cylinders (e.g., cylinder 1, cylinder 2, and cylinder 3) are not in the expansion stroke. Because cylinder 4 is in the expansion stroke, the controller continues to model the aircharge variation (e.g., a second aircharge variation) and update the aircharge in cylinder 4 accordingly (plot 410 of timeline 405). While the engine is stopped, the volume of cylinder 4 does not change (plot 412). However, the pressure in cylinder 4 (plot 414) decays toward the lower crankcase pressure as it shifts toward equilibrium, and the engine temperature (plot 408) also decreases. The change in the cylinder pressure and the change in the engine temperature both affect the aircharge in cylinder 4. As described above with respect to FIGS. 2 and 3, the controller updates the aircharge in cylinder 4 (plot 410 of timeline 405) based on a first-order decay time constant that is a function of the engine temperature (plot 408) and the engine age and additionally takes into account the decreasing pressure in cylinder 4 (plot 414) toward the crankcase pressure. At time t8, an engine restart is requested. Therefore, the controller resumes engine fueling (plot 402 of timeline 400). In particular, fuel is first provided to cylinder 4 (and not cylinder 1, cylinder 2, and cylinder 3) for an expansion combustion event for restarting the engine. As described above at 232 of FIG. 2, the controller determines an amount of fuel to provide to cylinder 4 for the expansion combustion based on the aircharge in cylinder 4 (plot 410 of timeline 405) at time t8 in order to produce a desired AFR. The pressure in cylinder 4 (plot 414) has not reached the crankcase pressure, and thus, the controller may directly determine the aircharge in cylinder 4 based on a duration spanning between time t7 and time t8. However, if an engine restart request were received at any other time between time t7 and time t8, the controller would use the cylinder 4 aircharge value of plot 410 at the given time (and not at time t8) to determine the amount of fuel for an expansion combustion event in cylinder 4.

If instead cylinder 4 is in the second condition, the pressure of cylinder 4 (dashed plot 415) increases after intake valve closing at time t6 as the volume of cylinder 4 decreases (plot 412) but remains below the crankcase pressure (dashed line CRKC). Further, the engine temperature does not appreciably change between time t6 and time t7. However, even with the intake and exhaust valves of cylinder 4 closed, the aircharge of cylinder 4 increases by a relatively small amount (plot 410). As described above with respect to FIGS. 2 and 3, a controller may model this increase in the aircharge (e.g., the first aircharge variation) as a function of the pressure in cylinder 4 (dashed plot 415). As an example, the rate of increase in the aircharge may be greater as the pressure of cylinder 4 further decreases below the crankcase pressure.

The engine reaches engine stop at time t7, with the engine speed equal to zero (plot 404 of timeline 400). At engine stop, cylinder 4 is in the expansion stroke (map 401 of timeline 400), while the other cylinders (e.g., cylinder 1, cylinder 2, and cylinder 3) are not in the expansion stroke. Because cylinder 4 is in the expansion stroke, the controller continues to model the aircharge variation (e.g., the second aircharge variation) and update the aircharge in cylinder 4 accordingly (dashed plot 411 of timeline 405). While the engine is stopped, the volume of cylinder 4 does not change (plot 412). However, the pressure in cylinder 4 (dashed plot 415) increases toward the higher crankcase pressure, and the engine temperature (plot 408) also decreases. The change in the cylinder pressure and the change in the engine temperature both affect the aircharge in cylinder 4. As described above with respect to FIGS. 2 and 3, the controller updates the aircharge in cylinder 4 (dashed plot 411 of timeline 405) based on a first-order decay time constant that is a function of the engine temperature (plot 408) and the engine age and additionally takes into account the increasing pressure in cylinder 4 (dashed plot 415) toward the crankcase pressure.

At time t8, an engine restart is requested. Therefore, the controller resumes engine fueling (plot 402 of timeline 400). In particular, fuel is first provided to cylinder 4 (and not cylinder 1, cylinder 2, and cylinder 3) for an expansion combustion event for restarting the engine. As described above at 232 of FIG. 2, the controller determines an amount of fuel to provide to cylinder 4 for the expansion combustion based on the aircharge in cylinder 4 (dashed plot 411 of timeline 405) at time t8 in order to produce a desired AFR. The pressure in cylinder 4 (dashed plot 415) has not reached the crankcase pressure, and thus, the controller may directly determine the aircharge in cylinder 4 based on a duration spanning between time t7 and time t8. However, if an engine restart request were received at any other time between time t7 and time t8, the controller would use the cylinder 4 aircharge value of dashed plot 411 at the given time (and not at time t8) to determine the amount of fuel for an expansion combustion event in cylinder 4.

For both the first condition and the second condition, the injected fuel forms an air-fuel mixture in cylinder 4, which is ignited (e.g., via a spark plug of cylinder 4) to produce a combustion event. The expanding gases from the combustion event provide torque for starting the engine, which may be assisted by an electric motor (e.g., a starter motor or an electric machine). As a result, the engine speed quickly increases (plot 404). Further, MAP decreases below atmospheric pressure (plot 406) due to vacuum produced by the engine as the engine spins up and additionally due to a lag in boost pressure being available via a turbocharger. Nominal combustion is resumed in cylinder 1, cylinder 2, cylinder 3, and cylinder 4 after the engine speed reaches a desired starting speed.

In this way, a cylinder aircharge may be accurately determined for an expansion combustion used in restarting the engine from an auto-stop. By tracking and/or modeling aircharge variation that occurs while the engine spins down to rest and while the engine is stopped, an amount of fuel provided for the expansion combustion mixes with the aircharge to accurately produce a desired air-fuel ratio. As a result, the expansion combustion may be robustly performed over a range of engine-off durations. By increasing a robustness of the expansion combustion, a reliance on a starter motor may be decreased, thereby decreasing starter motor wear. Further, an engine restart time may be decreased due to the torque produced via the expansion combustion. By decreasing the engine start time and decreasing starter motor wear, customer satisfaction may be increased.

The technical effect of accounting for cylinder pressure and aircharge variation during engine-off for fueling an expansion combustion during an engine restart is that an air-fuel ratio of the expansion combustion is accurately controlled.

As one example, a method comprises: responsive to a request to restart an engine from an auto-stop, determining a fuel mass to inject into a cylinder for a restart combustion event based on a duration of the auto-stop; and injecting the determined fuel mass and actuating a spark plug of the cylinder to perform the restart combustion event. In the preceding example, additionally or optionally, the cylinder is stopped in an expansion stroke during the auto-stop, with intake and exhaust valves of the cylinders closed, and the duration of the auto-stop comprises a period of time between the engine reaching a stop position during the auto-stop and receiving the request to restart the engine from the auto-stop. In one or both of the preceding examples, additionally or optionally, determining the fuel mass to inject into the cylinder for the restart combustion event based on the duration of the auto-stop includes: correcting an aircharge of the cylinder based on the duration of the auto-stop; and determining the fuel mass based on the corrected aircharge. In any or all of the preceding examples, additionally or optionally, correcting the aircharge of the cylinder based on the duration of the auto-stop includes determining an initial aircharge of the cylinder and an equilibrium aircharge of the cylinder, and reaching the engine stop position includes a speed of the engine reaching zero. In any or all of the preceding examples, additionally or optionally, the initial aircharge of the cylinder is determined based on an intake manifold pressure at a final intake valve closing event of the cylinder during the auto stop, prior to the engine reaching the stop position, and the equilibrium aircharge is determined based on crankcase pressure. In any or all of the preceding examples, additionally or optionally, the initial aircharge of the cylinder is further based on a pressure change in the cylinder between the final intake valve closing event and the engine reaching the stop position, a volume of the cylinder at the engine stop position, and a temperature of the engine at the stop position. In any or all of the preceding examples, additionally or optionally, correcting the aircharge of the cylinder based on the duration of the auto-stop further includes determining the corrected aircharge of the cylinder based on the initial aircharge of the cylinder, the equilibrium aircharge of the cylinder, the duration of the auto-stop, and a decay time constant. In any or all of the preceding examples, additionally or optionally, correcting the aircharge of the cylinder based on the duration of the auto-stop includes determining a pressure change in the cylinder over the duration of the auto-stop. In any or all of the preceding examples, additionally or optionally, determining the pressure change in the cylinder over the duration of the auto-stop includes: estimating an initial pressure in the cylinder based on an intake manifold pressure measured at a final intake valve closing event of the cylinder during the auto-stop, prior to the engine reaching the stop position; and determining the pressure change from the initial pressure based on the duration of the auto-stop, a pressure of a crankcase, and a decay time constant. In any or all of the preceding examples, additionally or optionally, determining the pressure change in the cylinder includes measuring a first pressure in the cylinder when the engine reaches the stop position via a cylinder pressure sensor and a measuring a second pressure in the cylinder via the cylinder pressure sensor when the request to restart the engine from the auto-stop is received.

As another example, a method comprises: during a first engine restart immediately following a first engine auto-stop having a first auto-stop duration, correcting an aircharge of a cylinder stopped in an expansion stroke by a first correction amount that is directly based on the first auto-stop duration; and during a second engine restart immediately following a second engine auto-stop having a second auto-stop duration, correcting the aircharge of the cylinder stopped in the expansion stroke by a second correction amount that is not directly based on the second auto-stop duration. In the preceding example, additionally or optionally, the first auto-stop duration is less than a duration for a pressure in the cylinder reaching an equilibrium pressure, and the second auto-stop duration is greater than the duration for the pressure in the cylinder reaching the equilibrium pressure. In one or both of the preceding examples, additionally or optionally, the equilibrium pressure is crankcase pressure, and the second correction amount includes correcting the aircharge of the cylinder to an equilibrium aircharge at the crankcase pressure. In any or all of the preceding examples, additionally or optionally, the first correction amount includes correcting the aircharge of the cylinder based on a pressure change in the cylinder from an initial pressure at engine stop toward the equilibrium pressure, the pressure change determined using a decay time constant that is a function of at least one of an age of the engine and a temperature of the engine. In any or all of the preceding examples, the method additionally or optionally further comprises: during the first engine restart, injecting a first fuel mass into the cylinder, the first fuel mass determined based on the first correction amount, and actuating a spark plug of the cylinder to perform a first expansion combustion restart; and during the second engine restart, injecting a second fuel mass into the cylinder, the second fuel mass determined based on the second correction amount, and actuating the spark plug of the cylinder to perform a second expansion combustion restart. In any or all of the preceding examples, additionally or optionally, both the first fuel mass and the second fuel mass are further determined based on a desired air-fuel ratio for expansion combustion restarts.

As another example, a system comprises: an engine including a plurality of cylinders, each cylinder including a direct fuel injector and piston coupled to a crankshaft positioned with a crankcase of the engine; and a controller including executable instructions stored in non-transitory memory that, when executed, cause the controller to: responsive to an engine shutdown request, shut down the engine for an engine auto-stop, including deactivating the direct fuel injector of each cylinder of the plurality of cylinders; track an aircharge variation in a first cylinder of the plurality of cylinders, the first cylinder stopped in an expansion combustion region of an engine cycle during the engine auto-stop; and responsive to an engine restart request, delivering fuel to the first cylinder for an expansion combustion event, an amount of the fuel determined based on the tracked aircharge variation. In the preceding example, additionally or optionally, each cylinder includes an intake valve coupled thereto, and to track the aircharge variation in the first cylinder of the plurality of cylinders, the controller includes further instructions stored in non-transitory memory that, when executed, cause the controller to: responsive to a speed of the engine decreasing below a threshold after shutting down the engine for the engine auto-stop and prior to the speed reaching zero, determine a first aircharge in the first cylinder at a closing timing of the intake valve of the first cylinder; and responsive to the speed of the engine reaching zero at an engine stop position, determine a second aircharge in the first cylinder based on the first aircharge and a first aircharge variation, the first aircharge variation a function of a temperature of the engine and an age of the engine. In any or all of the preceding examples, additionally or optionally, to track the aircharge variation in the first cylinder of the plurality of cylinders, the controller includes further instructions stored in non-transitory memory that, when executed, cause the controller to: responsive to the engine restart request, determine a third aircharge in the first cylinder based on the second aircharge and a second aircharge variation, the second aircharge variation based on a duration since reaching the engine stop position and a modeled equilibrium aircharge of the first cylinder determined based on a pressure of the crankcase. In any or all of the preceding examples, additionally or optionally, to determine the amount of fuel based on the tracked aircharge variation, the controller includes further instructions stored in non-transitory memory that, when executed, cause the controller to: determine the amount of fuel based on the third aircharge in the first cylinder and a desired air-fuel ratio for the expansion combustion event.

In another representation, a method comprises: restarting an engine from an auto-stop using torque produced by a combustion event in a cylinder of the engine, an amount of fuel for the combustion event determined by correcting an aircharge in the cylinder based on a pressure change in the cylinder during the auto-stop. In the preceding example, additionally or optionally, the cylinder is an expansion stroke during the auto-stop. In one or both of the preceding examples, additionally or optionally, the cylinder is in a compression stroke during the auto-stop. In any or all of the preceding examples, additionally or optionally, correcting the aircharge in the cylinder based on the pressure change in the cylinder during the auto-stop includes estimating the pressure change in the cylinder based on an initial pressure in the cylinder during the auto-stop, an equilibrium pressure in the cylinder, and a duration of the auto-stop. In any or all of the preceding examples, additionally or optionally, the initial pressure in the cylinder is an intake manifold pressure of the engine at intake valve closing of the cylinder, prior to the engine reaching rest during the auto-stop, and the equilibrium pressure is a crankcase pressure of the engine. In any or all of the preceding examples, additionally or optionally, restarting the engine is responsive to an auto-start request, and correcting the aircharge in the cylinder based on the pressure change in the cylinder during the auto-stop includes: measuring the pressure change in the cylinder via a pressure sensor; and determining the corrected aircharge using a final pressure measured responsive to receiving the auto-start request.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a request to restart an engine from an auto-stop, determining a fuel mass to inject into a cylinder for a restart combustion event based on a duration of the auto-stop, including correcting an aircharge of the cylinder based on the duration of the auto-stop; and determining the fuel mass based on the corrected aircharge; and
injecting the determined fuel mass and actuating a spark plug of the cylinder to perform the restart combustion event, wherein the cylinder is stopped in an expansion stroke during the auto-stop, with intake and exhaust valves of the cylinders closed, and the duration of the auto-stop comprises a period of time between the engine reaching a stop position during the auto-stop and receiving the request to restart the engine from the auto-stop.

2. The method of claim 1, wherein correcting the aircharge of the cylinder based on the duration of the auto-stop includes determining an initial aircharge of the cylinder and an equilibrium aircharge of the cylinder, and reaching the engine stop position includes a speed of the engine reaching zero.

3. The method of claim 2, wherein the initial aircharge of the cylinder is determined based on an intake manifold pressure at a final intake valve closing event of the cylinder during the auto stop, prior to the engine reaching the stop position, and the equilibrium aircharge is determined based on crankcase pressure.

4. The method of claim 3, wherein the initial aircharge of the cylinder is further based on a pressure change in the cylinder between the final intake valve closing event and the engine reaching the stop position, a volume of the cylinder at the engine stop position, and a temperature of the engine at the stop position.

5. The method of claim 3, wherein correcting the aircharge of the cylinder based on the duration of the auto-stop further includes determining the corrected aircharge of the cylinder based on the initial aircharge of the cylinder, the equilibrium aircharge of the cylinder, the duration of the auto-stop, and a decay time constant.

6. The method of claim 1, wherein correcting the aircharge of the cylinder based on the duration of the auto-stop includes determining a pressure change in the cylinder over the duration of the auto-stop.

7. The method of claim 6, wherein determining the pressure change in the cylinder over the duration of the auto-stop includes:
estimating an initial pressure in the cylinder based on an intake manifold pressure measured at a final intake valve closing event of the cylinder during the auto-stop, prior to the engine reaching the stop position; and
determining the pressure change from the initial pressure based on the duration of the auto-stop, a pressure of a crankcase, and a decay time constant.

8. The method of claim 6, wherein determining the pressure change in the cylinder includes measuring a first pressure in the cylinder when the engine reaches the stop position via a cylinder pressure sensor and a measuring a second pressure in the cylinder via the cylinder pressure sensor when the request to restart the engine from the auto-stop is received.

9. A method, comprising:
during a first engine restart immediately following a first engine auto-stop having a first auto-stop duration, correcting an aircharge of a cylinder stopped in an expansion stroke by a first correction amount that is directly based on the first auto-stop duration; and
during a second engine restart immediately following a second engine auto-stop having a second auto-stop duration, correcting the aircharge of the cylinder stopped in the expansion stroke by a second correction amount that is not directly based on the second auto-stop duration.

10. The method of claim 9, wherein the first auto-stop duration is less than a duration for a pressure in the cylinder reaching an equilibrium pressure, and the second auto-stop duration is greater than the duration for the pressure in the cylinder reaching the equilibrium pressure.

11. The method of claim 10, wherein the equilibrium pressure is crankcase pressure, and the second correction amount includes correcting the aircharge of the cylinder to an equilibrium aircharge at the crankcase pressure.

12. The method of claim 10, wherein the first correction amount includes correcting the aircharge of the cylinder based on a pressure change in the cylinder from an initial pressure at engine stop toward the equilibrium pressure, the pressure change determined using a decay time constant that is a function of at least one of an age of the engine and a temperature of the engine.

13. The method of claim 9, further comprising:
during the first engine restart, injecting a first fuel mass into the cylinder, the first fuel mass determined based on the first correction amount, and actuating a spark plug of the cylinder to perform a first expansion combustion restart; and
during the second engine restart, injecting a second fuel mass into the cylinder, the second fuel mass determined based on the second correction amount, and actuating the spark plug of the cylinder to perform a second expansion combustion restart.

14. The method of claim 13, wherein both the first fuel mass and the second fuel mass are further determined based on a desired air-fuel ratio for expansion combustion restarts.

15. A system, comprising:
an engine including a plurality of cylinders, each cylinder including a direct fuel injector and piston coupled to a crankshaft positioned with a crankcase of the engine; and
a controller including executable instructions stored in non-transitory memory that, when executed, cause the controller to:
responsive to an engine shutdown request, shut down the engine for an engine auto-stop, including deactivating the direct fuel injector of each cylinder of the plurality of cylinders;
track an aircharge variation in a first cylinder of the plurality of cylinders, the first cylinder stopped in an expansion combustion region of an engine cycle during the engine auto-stop; and
responsive to an engine restart request, delivering fuel to the first cylinder for an expansion combustion event, an amount of the fuel determined based on the tracked aircharge variation.

16. The system of claim 15, wherein each cylinder includes an intake valve coupled thereto, and to track the aircharge variation in the first cylinder of the plurality of cylinders, the controller includes further instructions stored in non-transitory memory that, when executed, cause the controller to:
responsive to a speed of the engine decreasing below a threshold after shutting down the engine for the engine auto-stop and prior to the speed reaching zero, determine a first aircharge in the first cylinder at a closing timing of the intake valve of the first cylinder; and
responsive to the speed of the engine reaching zero at an engine stop position, determine a second aircharge in the first cylinder based on the first aircharge and a first aircharge variation, the first aircharge variation a function of a temperature of the engine and an age of the engine.

17. The system of claim 16, wherein to track the aircharge variation in the first cylinder of the plurality of cylinders, the controller includes further instructions stored in non-transitory memory that, when executed, cause the controller to:
responsive to the engine restart request, determine a third aircharge in the first cylinder based on the second aircharge and a second aircharge variation, the second aircharge variation based on a duration since reaching the engine stop position and a modeled equilibrium aircharge of the first cylinder determined based on a pressure of the crankcase.

18. The system of claim 17, wherein to determine the amount of fuel based on the tracked aircharge variation, the controller includes further instructions stored in non-transitory memory that, when executed, cause the controller to:

determine the amount of fuel based on the third aircharge in the first cylinder and a desired air-fuel ratio for the expansion combustion event.

* * * * *